United States Patent [19]

Lee et al.

[11] Patent Number: 5,042,195
[45] Date of Patent: Aug. 27, 1991

[54] SYSTEM FOR CULTIVATING AND HARVESTING BEAM SPROUTS

[76] Inventors: Jong S. Lee, #1-38, Moonwha-Dong, Apt. D-408, Choong-Ku, Daejeon, Choong-Nam; Kyu H. Rho, #230-5, Apkujung-Dong, Hyundai Apt. 84-1303, Kangnam-Ku, Seoul, both of Rep. of Korea

[21] Appl. No.: 446,678

[22] Filed: Dec. 6, 1989

[51] Int. Cl.$^5$ ............................................. A01G 31/00
[52] U.S. Cl. .......................................... 47/61; 47/60; 56/194
[58] Field of Search ................. 47/60, 67, 61; 56/194, 56/198, 199, 202

[56] References Cited

U.S. PATENT DOCUMENTS

| | | | |
|---|---|---|---|
| 2,051,461 | 8/1936 | Lee | 47/60 |
| 2,141,478 | 12/1938 | Lund | 47/60 |
| 2,897,631 | 8/1959 | Hawsley, Jr. et al. | 47/60 |
| 2,917,867 | 12/1959 | Bailey | 47/60 |
| 2,928,211 | 3/1960 | Martin | 47/60 |
| 2,952,096 | 9/1960 | Hughes et al. | 47/60 |
| 3,458,951 | 8/1969 | Martin | 47/60 |
| 4,144,671 | 3/1979 | Lee | 47/61 X |
| 4,289,614 | 9/1981 | Suzuki | 47/61 X |

Primary Examiner—Richard E. Chilcot, Jr.
Assistant Examiner—Linda J. Watson
Attorney, Agent, or Firm—Donald A. Kettlestrings

[57] ABSTRACT

A system for cultivating and harvesting bean sprouts includes an enclosed container having a door movable between open and closed positions for excluding external light from the interior of the container when the door is in a closed position. A plurality of bean sprout support elements, each of the elements defining an open mesh screen for supporting beans and bean sprouts growing from the beans, are removably stacked within the container in vertical, spaced apart relationship with each other. A cultivating fluid is circulated within the container and over and around the beans and bean sprouts. The bean sprouts are harvested by positioning the bean sprout support elements onto conveyor elements which cause the support elements and bean sprouts to be passed over serving elements which separate fine roots and chaff from the bean sprouts, and the bean sprouts are collected for later use.

17 Claims, 3 Drawing Sheets

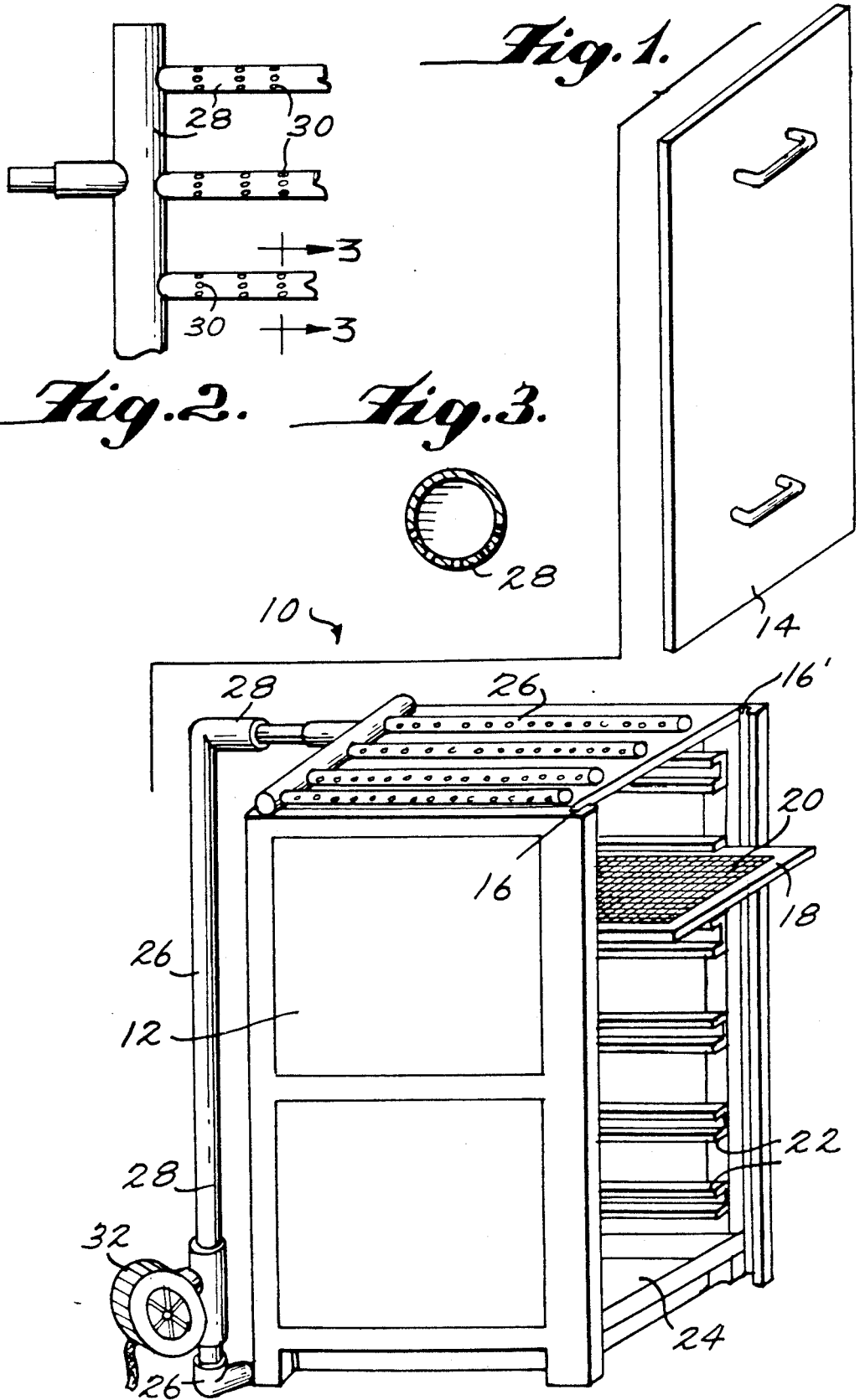

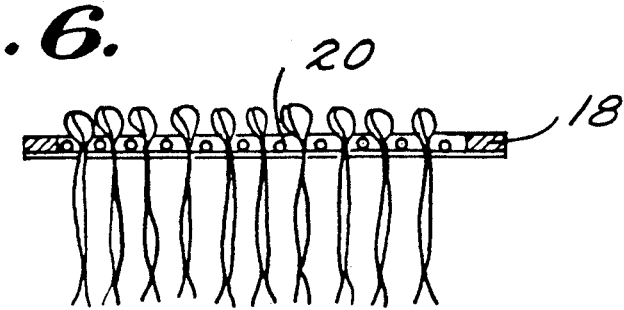
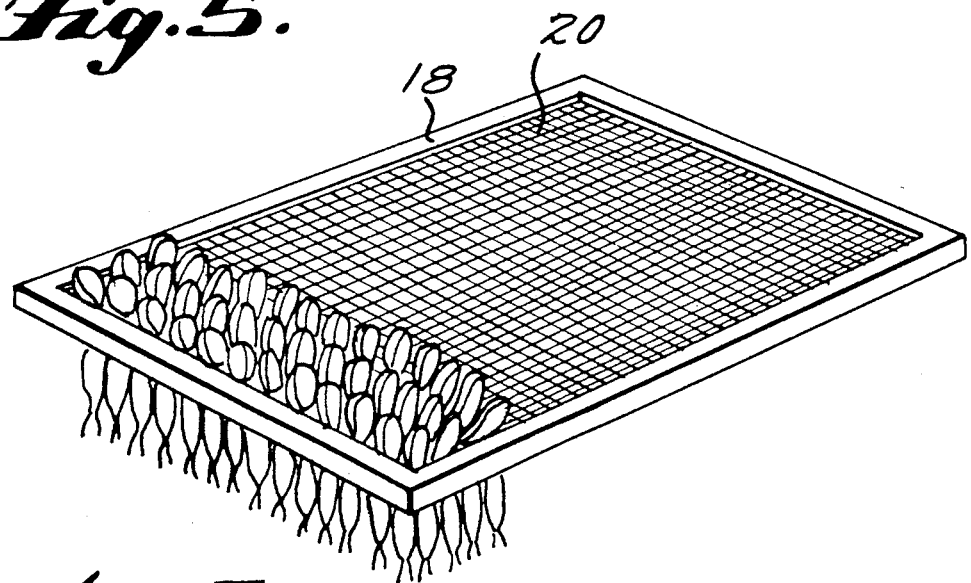
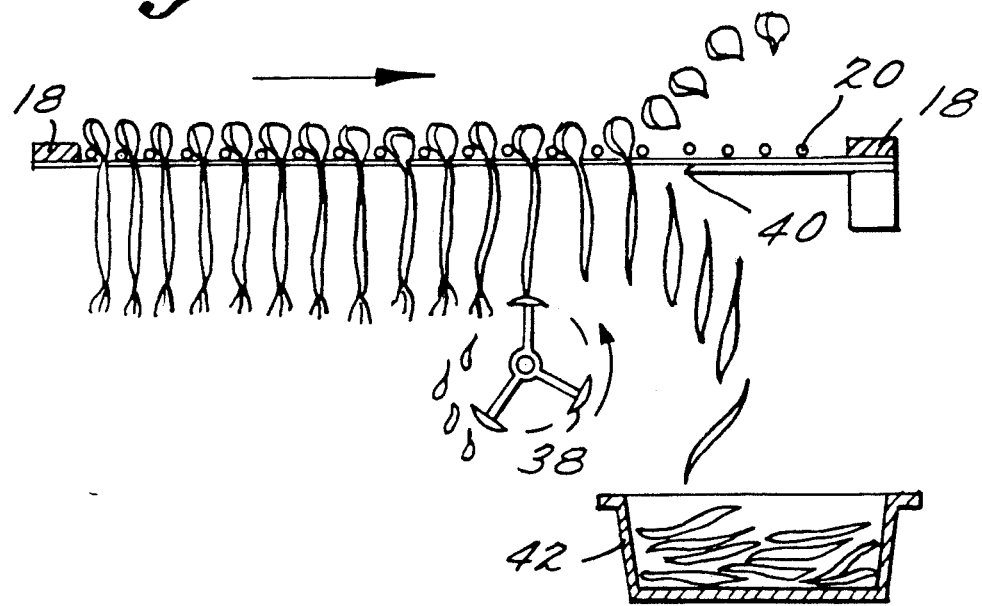

SYSTEM FOR CULTIVATING AND HARVESTING BEAN SPROUTS

This invention relates to a cultivating and harvesting system and more particularly to a system for cultivating and harvesting bean sprouts.

Bean sprouts have been a popular food item in the orient and elsewhere for many years. Bean sprouts are particularly popular as a component of salads. However, before bean sprouts can be served, the bean chaff and fine roots from the bean sprouts must be separated from the palatable stems. In the past, this separation of bean chaff and fine roots from the palatable bean sprout stems has been accomplished manually.

It is, therefore, an object of the present invention to provide a system for cultivating and harvesting bean sprouts.

Another object is to provide such a system which quickly and easily separates the bean chaff and fine roots from the palatable bean sprout stems.

A further object of the invention is the provision of such a system which cultivates bean sprouts in a controlled environment.

Still another object is to provide such a system which eliminates the need for manual separation of bean chaff and fine roots from the palatable bean sprout stems.

Additional objects and advantages of the invention will be set forth in part in the description which follows, and in part will be obvious from the description, or may be learned by practice of the invention. The objects and advantages are attained by means of the instrumentalities and combinations particularly pointed out in the appended claims.

To achieve these and other objects the present invention provides a system for cultivating and harvesting bean sprouts which includes: enclosed container means having a door movable between open and closed positions for substantially excluding external light from the interior of the container means when the door is in a closed position; means in operative relationship with the container means for cultivating bean sprouts within the container means; and means for use in cooperation with the cultivating means for harvesting the bean sprouts.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a perspective view of the cultivating portion and container means of the invention;

FIG. 2 is a fragmentary bottom plan view of the piping and showing the apertures in the piping;

FIG. 3 is a sectional view taken along the line 3—3 in FIG. 2 and looking in the direction of the arrows;

FIG. 5 is a perspective view of a bean sprout support element;

FIG. 6 is a sectional view taken along the line 6—6 in FIG. 5 and looking in the direction of the arrows; and FIG. 7 is a diagrammatic side elevation view showing a bean sprout support element and bean sprouts on the support element as they move past the severing means.

Figure 4:
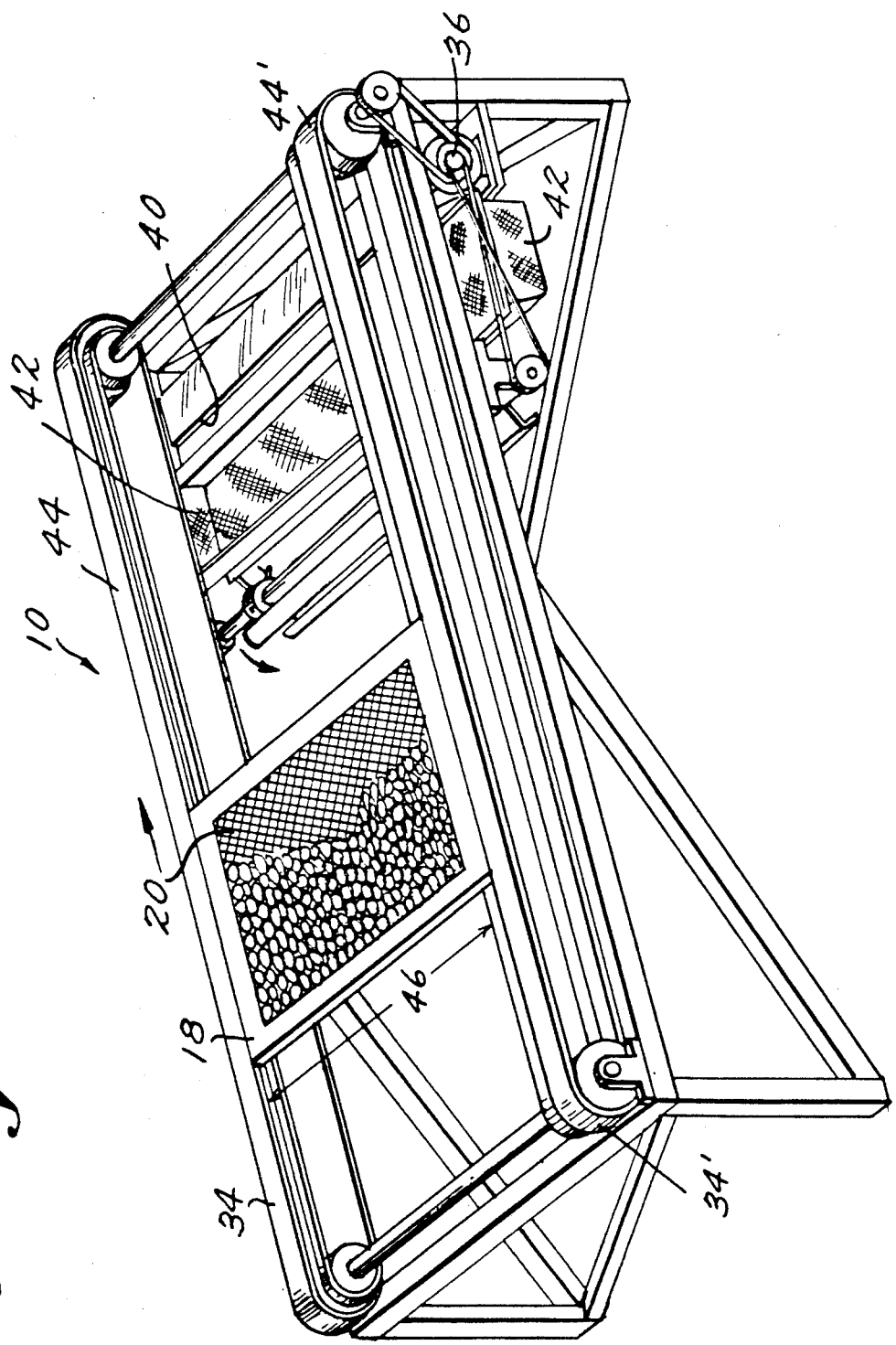
FIG. 4 is a perspective view of the harvesting portion of the invention.

With reference now to the drawings, wherein like reference characters designate like or corresponding parts throughout the several views, there is shown a system 10 for cultivating and harvesting bean sprouts in accordance with this invention. System 10 includes enclosed container means 12 having a door 14 movable between open and closed positions for substantially excluding external light from the interior of the container means when the door is in a closed position. Door 14 may be mounted to container 12 by conventional hinges (not shown), or container 12 may be provided with door-receiving slides 16, 16' for slideably receiving door 14.

In accordance with the invention, means are provided in operative relationship with container 12 for cultivating bean sprouts within the container, and means are provided for use in cooperation with the cultivating means for harvesting the bean sprouts.

More specifically, the cultivating means include a plurality of bean sprout support elements 18, each of elements 18 defining an open mesh screen 20 for supporting beans and bean sprouts growing from the beans.

A plurality of elements 22 are provided in operative relationship with the interior of container means 12 for slideably receiving and supporting elements 18 in vertical stacked and spaced apart relationship with each other. In accordance with the invention, receiving and supporting elements 22 are positioned for enabling elements 18 to be spaced apart from each other by a sufficient distance to allow the bean sprouts to grow downwardly without interference from the support elements 18 located directly beneath the bean sprouts. This will permit the bean sprouts to grow downwardly without any bend in the sprouts.

In accordance with the invention, the cultivating means further include a fluid holding element 24 positioned adjacent to a bottom portion of container 12 and beneath vertically stacked support elements 18. Fluid distribution means 26 are provided in opearative relationship with fluid holding element 24 and with stacked support elements 18 for selectively moving cultivating fluid, such as water, from holding element 24 over and through support elements 18 and over and around the bean sprouts and back to holding element 24.

More specifically, fluid distribution means 26 include piping 28 in fluid communication with fluid holding element 24 and positioned, in part, above stacked support elements 18. Piping 28 defines apertures 30 located above stacked elements 18 for enabling distribution of cultivating fluid over and through support elements 18 and over and around the beans and bean sprouts. A pump 32 is provided in operative relationship with piping 28 for drawing fluid from holding element 24 and for directing it through piping 28 and through apertures 30. A conventional timer, not shown, may also be provided in operative relationship with pump 32 for controlling operation of the pump.

The size of the openings in each mesh screen 20 is no less than the neck diameter of fully cultivated bean sprouts, or substantially one millimeter by one millimeter. Fluid holding element 24 is an open-topped pan which will receive the cultivating fluid as it passes down and through support elements 18. The open-topped pan configuration also enables the cultivating fluid to evaporate upwardly through the growing bean sprouts to encourage downward growth of the sprouts in cooperation with gravity. Bean sprouts grow naturally toward the direction of moisture rise and also grow naturally downwardly with the force of gravity.

In accordance with the invention, the harvesting means include means 34, 34' for holding those support elements 18 which have the cultivated bean sprouts positioned on the support elements. The harvesting means further include means 36 in operative relationship with holding means 34, 34' for moving the holding means, and the support elements 18 positioned on the holding means, along a predetermined path.

First means 38 are provided in operative relationship with holding means 34, 34' for severing fine roots from the bean sprouts as support elements 18 move along the predetermined path and pass over severing means 38. Second means 40 are provided in operative relationship with holding means 34, 34' for severing chaff from the bean sprouts as support elements 18 move along the predetermined path and pass over second severing means 40. Means 42 are provided in operative relationship with severing means 40 for collecting the bean sprouts after the chaff has been severed from the sprouts.

Preferably, holding means 34, 34' include first and second conventional conveyor elements 44, 44' spaced apart and positioned in substantially parallel relationship with respect to each other. Conveyor elements 44, 44' are spaced apart from each other by a distance substantially equal to a width dimension 46 of each open mesh screen 20.

Severing means 38, 40 are vertically adjustable in a conventional manner in their positions with respect to holding means 34, 34' and with respect to conveyor elements 44, 44'. First severing means 38 is preferably a rotary cutter having a plurality of blades, and each blade defines a width dimension substantially equal to width dimension 46 of each screen 20. Similarly, second severing means 40, which is preferably a shear cutter, defines a width dimension substantially equal to width dimension 46 of each screen 20. The width dimensions of severing means 38, 40 enable the severing means to cut substantially all of the bean sprouts across the entire width of support elements 18 as the support elements and the bean sprouts pass over severing means 38, 40.

In operation, beans are placed onto screens 20 of each of support elements 18. Support elements 18 are then slideably positioned onto receiving and supporting elements 22 within container 12. Door 14 is then closed to exclude light from outside the container during the period of time that the bean sprouts are being cultivated.

Water or other cultivating fluid is stored in holding element 24. Pump 32, which can be controlled by a conventional timer, takes the water or other cultivating fluid from holding element 24 and passes it through piping 28 and through apertures 30. The water or other cultivating fluid emitted from apertures 30 passes downwardly over and around the beans and bean sprouts to facilitate their growth. Open-topped holding element 24 receives the water or other cultivating fluid and permits it to be recycled through piping 28 and through apertures 30 by pump 32. Open-topped holding element 24 also permits water or other cultivating fluid to freely evaporate and to pass upwardly over and around the beans and bean sprouts. This encourage downward growth of the bean sprouts. Pump 32 is preferably a conventional electrically powered pump.

When the bean sprouts have grown to the desired size, support elements 18 are removed from container 12 and are manually placed onto conveyor elements 44, 44'. The conveyor elements are powered by motor 36, which also may be used to rotatably activate first severing means 38.

Support elements 18, with the bean sprouts extending beneath each mesh screen 20, pass over rotary cutter 38, which trims the fine roots off the bean sprouts. Rotary cutter 38 is vertically adjustable in a conventional manner to control the distance at which the fine roots of the bean sprouts are severed.

Conveyor elements 44, 44' then cause support elements 18 to move further along the predetermined path so that shear cutter 40 cuts off the neck part of the bean sprouts from the chaff. The trimmed bean sprouts fall into collecting means or basket 42, which can be removed for packing and shipping the bean sprouts.

Shear cutter 40 is adjustably mounted with respect to conveyor elements 44, 44' in a conventional manner to permit control of the location at which the bean sprouts are severed from the chaff.

The fine roots and chaff of the bean sprouts may be collected separately from the bean sprouts for use as livestock feed or fertilizer.

After the bean sprouts have been harvested from support elements 18, the support elements can be reused in the manner described.

The invention in its broader aspects is not limited to the specific details shown and described, and departures may be made from such details without departing from the principles of the invention and without sacrificing its chief advantages.

What is claimed is:

1. A system for cultivating and harvesting bean sprouts comprising:
    enclosed container means having a door movable between open and closed positions for substantially excluding external light from the interior of said container means when said door is in a closed position;
    means in operative relationship with said container means for cultivating bean sprouts within said container means, said cultivating means including,
        a plurality of bean sprout support elements, each of said elements defining an open mesh screen for supporting beans and said bean sprouts growing from said beans,
        a plurality of elements in operative relationship with the interior of said container means for slidably receiving and supporting said support elements in vertical stacked and spaced apart relationship with each other,
        a fluid holding element positioned adjacent to a bottom portion of said container means and beneath said vertically stacked support elements,
        fluid distribution means in operative relationship with said fluid holding element and with said stacked support elements for selectively moving fluid from said holding element for distribution over and through said support elements, over and around said bean sprouts and back to said holding element,
        said open mesh screens of said support elements positioned with respect to each other and with respect to said fluid distribution means and said fluid holding element for enabling said fluid to pass from said fluid distribution means in a substantially unrestricted manner downwardly through all of said support elements to said holding element and for enabling evaporated fluid from said fluid holding element to pass in a substantially unrestricted manner upwardly through all of said support elements; and means for use in cooperation with said cultivating means for harvesting said bean sprouts.

2. A system as in claim 1 wherein said fluid distribution means include:

piping in fluid communication with said fluid holding element and positioned, in part, above said stacked support elements, said piping defining apertures located above said stacked support elements for enabling distribution of fluid over and through said support elements and over and around said bean sprouts; and a pump in operative relationship with said piping for selectively drawing fluid from said holding element and directing it through said apertures.

3. A system as in claim 2 wherein the size of the openings in said mesh in said screen is no less than neck diameters of fully cultivated bean sprouts, or substantially one millimeter by one millimeter.

4. A system as in claim 2 wherein said fluid holding element includes an open-topped pan.

5. A system as in claim 2 further including timer means in operative relationship with said pump for controlling operation of said pump.

6. A system as in claim 2 wherein said harvesting means include:

means for holding said support elements having said cultivated bean sprouts positioned on said support elements;

means in operative relationship with said holding means for moving said holding means and said support elements positioned on said holding means along a predetermined path;

first means in operative relationship with said holding means for severing fine roots from said bean sprouts as said support elements move along said predetermined path;

second means in operative relationship with said holding means for severing chaff from said bean sprouts as said support elements move along said predetermined path; and means in operative relationship with said second severing means for collecting said bean sprouts after said chaff is severed from said sprouts.

7. A system as in claim 6 wherein said holding means include first and second conveyor elements spaced apart and positioned in substantially parallel relationship with respect to each other.

8. A system as in claim 7 wherein said first and second severing means are adjustable in their positions with respect to said holding means.

9. A system as in claim 8 wherein said conveyor elements are spaced apart from each other by a distance substantially equal to a width dimension of said open mesh screen.

10. A system as in claim 9 wherein said first severing means defines a width dimension substantially equal to said width dimension of said screen.

11. A system as in claim 10 wherein said second severing means defines a width dimension substantially equal to said width dimension of said screen.

12. A system for cultivating and harvesting bean sprouts comprising:

enclosing container means having a door movable between open and closed positions for substantially excluding external light from the interior of said container means when said door is in a closed position;

means in operative relationship with said container means for cultivating bean sprouts within said container means; and means for use in cooperation with said cultivating means for harvesting said bean sprouts, said harvesting means including, means for holding said support elements having said cultivated bean sprouts positioned on said support elements, means inoperative relationship with said holding means for moving said holding means and said support elements positioned on said holding means along a predetermined path, first means in operative relationship with said holding means for severing fine roots from said bean sprouts as said support elements move along said predetermined path, second means in operative relationship with said holding means for severing chaff from said bean sprouts as said support elements move along said predetermined path, and means in operative relationship with said second severing means for collecting said bean sprouts after said chaff is severed from said sprouts.

13. A system as in claim 11 wherein said holding means include first and second conveyor elements spaced apart and positioned in substantially parallel relationship with respect to each other.

14. A system as in claim 13 wherein said first and second severing means are adjustable in their positions with respect to said holding means.

15. A system as in claim 14 wherein said conveyor elements are spaced apart from each other by a distance substantially equal to a width dimension of said open mesh screen.

16. A system as in claim 15 wherein said first severing means defines a width dimension substantially equal to said width dimension of said screen.

17. A system as in claim 16 wherein said second severing means defines a width dimension substantially equal to said width dimension of said screen.

* * * * *